INVENTORS:
RAYMOND M. ULRICH
JOHN J. ULRICH
By SOLOMON D. ULRICH

Sept. 16, 1969  J. J. ULRICH ET AL  3,466,989

EARTH MATERIALS HANDLING APPARATUS

Filed April 21, 1965  6 Sheets-Sheet 2

INVENTORS:
RAYMOND M. ULRICH
JOHN J. ULRICH
SOLOMON D. ULRICH

By Gary, Parker, Juettner & Cullinan
Attys

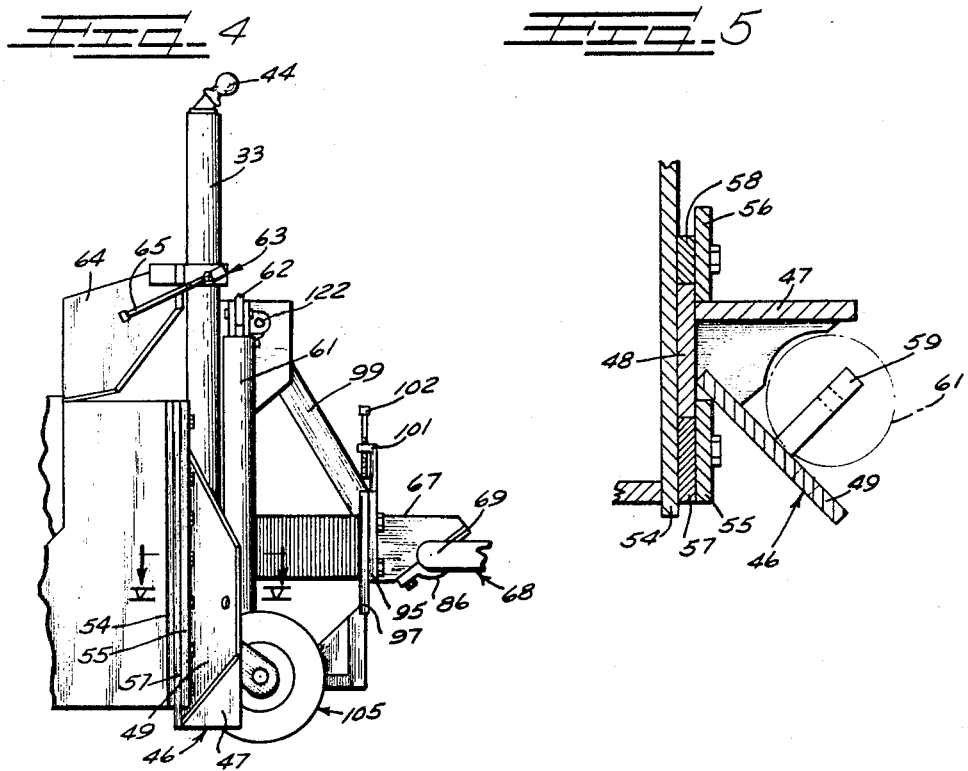
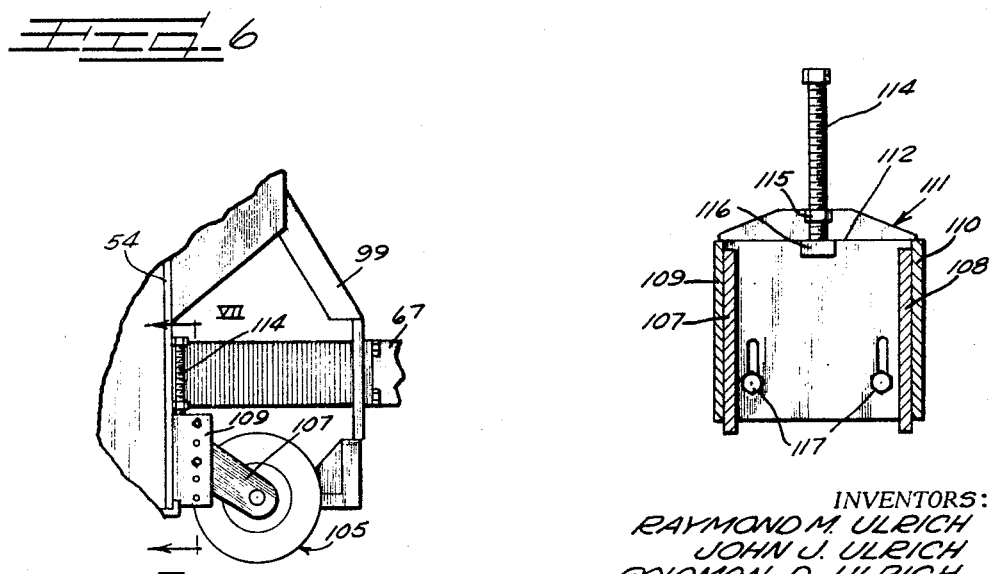
INVENTORS:
RAYMOND M. ULRICH
JOHN J. ULRICH
SOLOMON D. ULRICH
By Gary Parker, Juettner & Cullinan
Attys

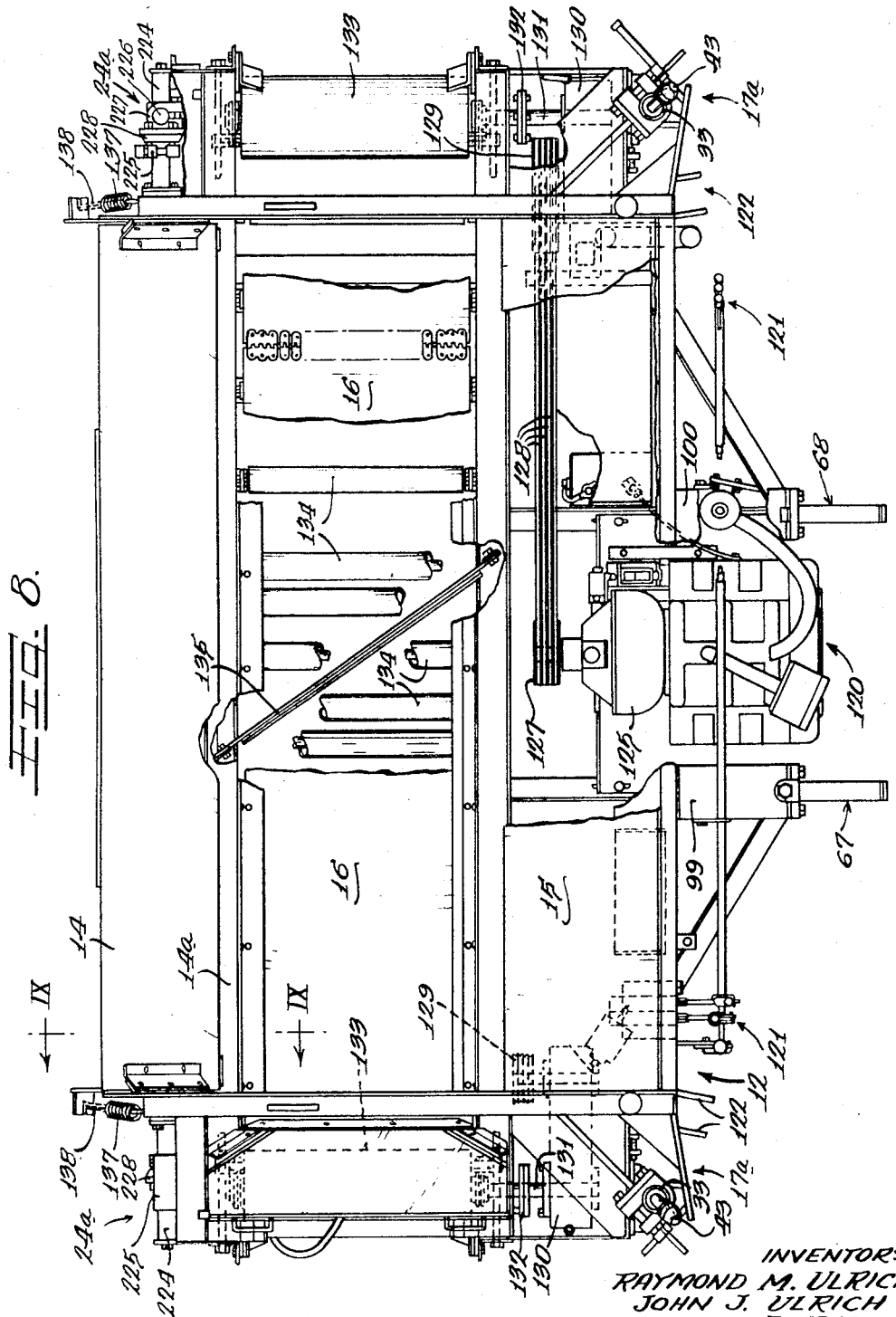

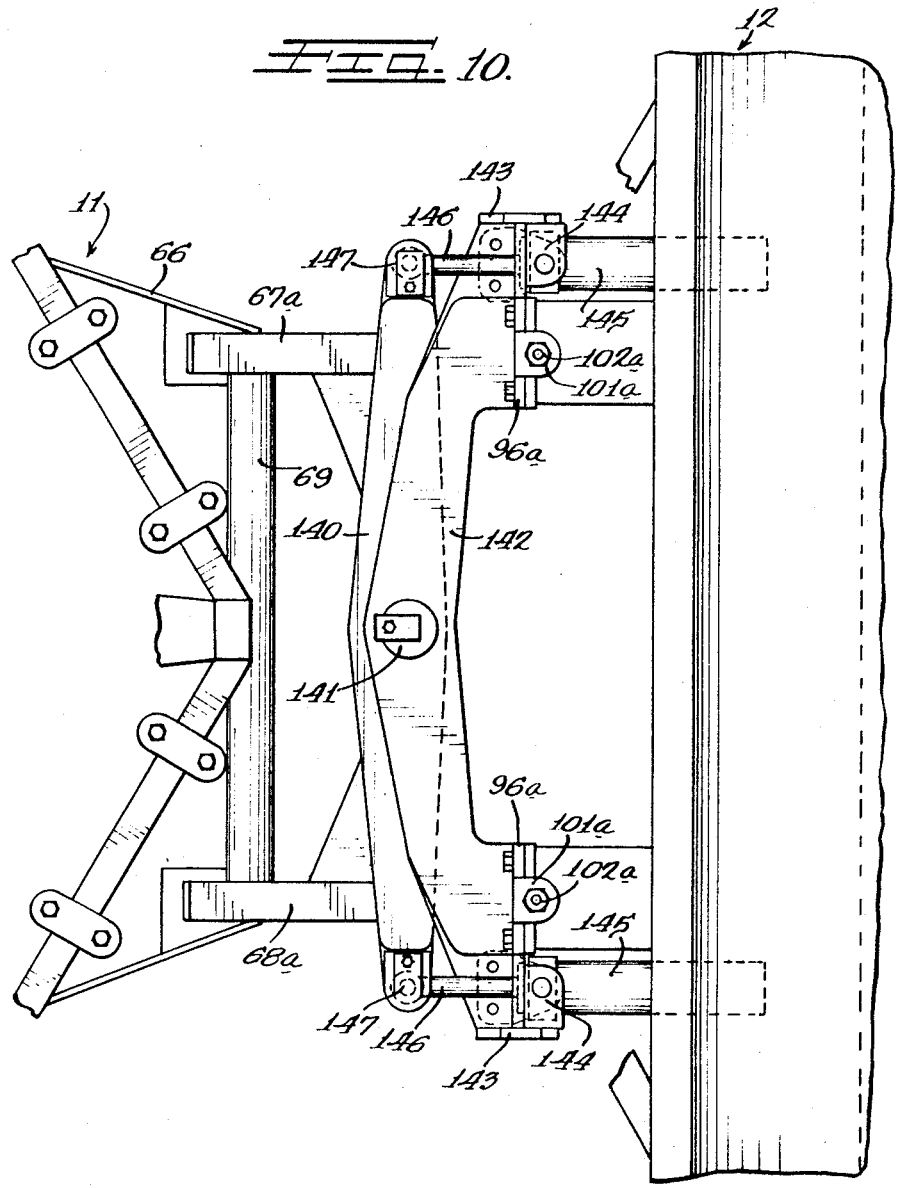

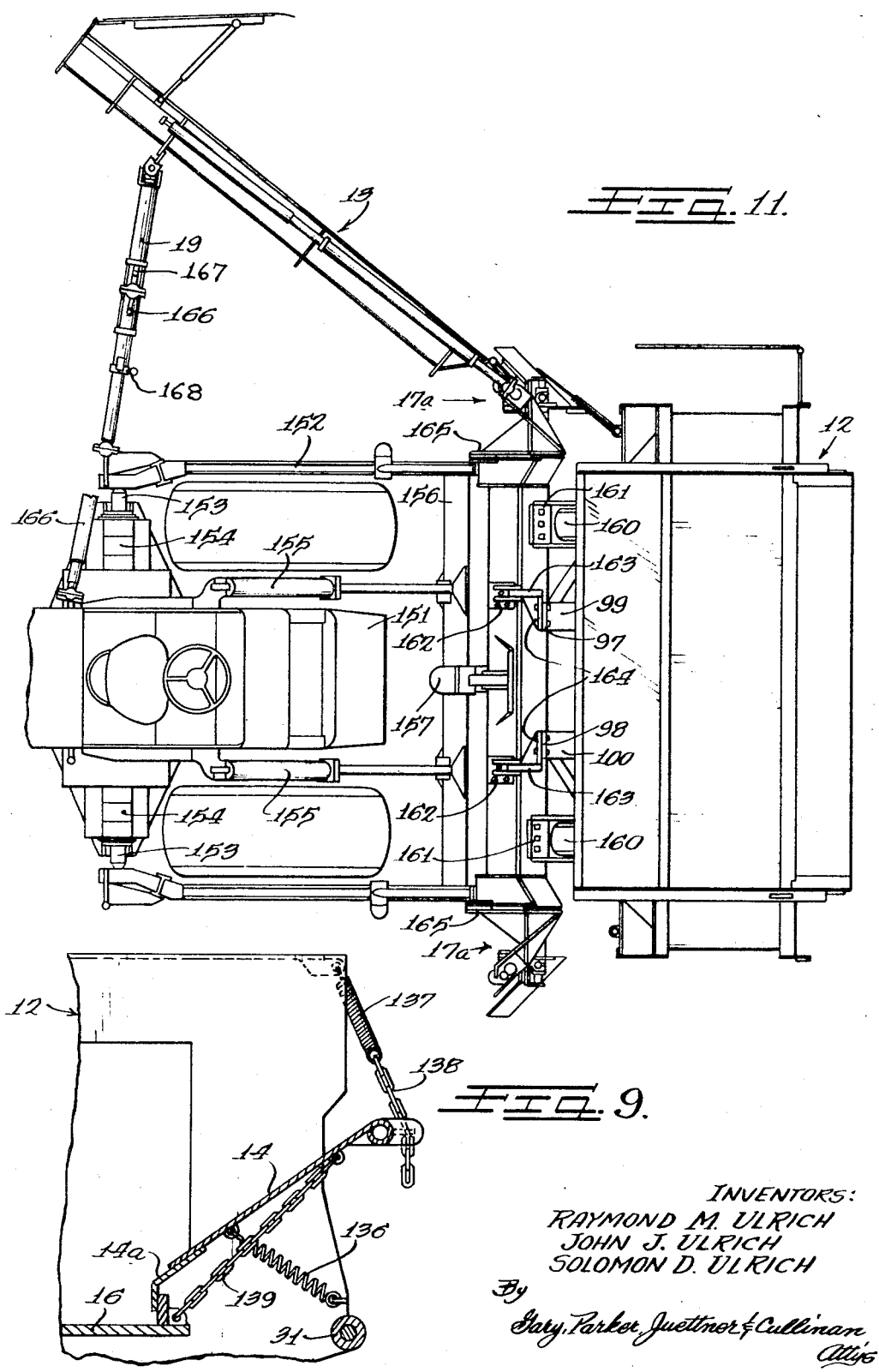

United States Patent Office 3,466,989
Patented Sept. 16, 1969

3,466,989
EARTH MATERIALS HANDLING APPARATUS
John J. Ulrich, El Paso, Raymond M. Ulrich, Roanoke, and Solomon D. Ulrich, Metamora, Ill., assignors, by mesne assignments, to Ulrich Manufacturing Co., Roanoke, Ill., a corporation of Delaware
Filed Apr. 21, 1965, Ser. No. 449,831
Int. Cl. E01c 19/12, 19/48, 23/06
U.S. Cl. 94—44   18 Claims

ABSTRACT OF THE DISCLOSURE

A shoulder spreader attachment detachably connectable to the front of a motor grader, tractor or the like and comprising a frame, a road material hopper in the frame, a conveyor in the hopper for laterally discharging the material and a strike-off blade projecting transversely outward from the frame for receiving the material and spreading it over a road shoulder is hereby provided with improved coupling means between the frame and the propelling vehicle and improved blade mounting means for effectively maintaining the blade in position and insuring its proper operation; said mounting means facilitating attachment of the blade to either side of the frame for outward projection to either side of the vehicle and including means for quickly adjusting its elevation and vertical and horizontal altitudes.

---

The present invention relates to a shoulder spreader, and more particularly to a shoulder spreader attachment for operation in front of a motor grader, tractor, or other vehicle to be propelled thereby. The spreader is versatile and can accommodate wide variations in operating conditions, with a strike-off blade that is reversible and readily adjustable as to its vertical position and its angular attitude in both the vertical and horizontal planes.

The invention was evolved with the general object of overcoming disadvantages of prior art shoulder spreader attachments. In general, such attachments comprise a frame supported on wheels and the propelling vehicle for movement over the pavement, a hopper in the frame for receiving road materials from dump trucks traveling in front of the attachment, a strike-off blade projecting transversely from the frame over the road shoulder, and a conveyor for delivering material from the hopper to the front of the strike-off blade.

With such attachments, the tractor or motor grader used as the propelling vehicle is free for other work when not used in spreading, and there is no major investment such as required in single purpose self-propelled machines. As a result, such attachments have been used extensively. However, with prior constructions, the spreading action has not always been as stable and as accurate as would be desired, particularly when the material being spread or the shoulder conditions are such that impactions or solid materials are engaged by the strike-off blade, tending to cause it to ride up or to cause the attachment to shift laterally. In addition, the attachments have not been readily mounted on the grader or tractor, and adjustments have been difficult.

An object of the present invention is to provide a shoulder spreader attachment including means for connecting the strike-off blade to the attachment frame and for connecting the attachment frame to the propelling vehicle in such manner as rigidly to restrain the strike-off blade against movement whereby to assure accurate and consistent spreading of materials.

Another object of the invention is to provide a shoulder spreader attachment including coupling means between the attachment frame and the propelling vehicle for obtaining maximum benefit from the vehicle and stabilizing the operation of the spreader.

A further object of the invention is the provision of a shoulder spreader attachment including means for conveniently and quickly adjusting the strike-off blade with regard to its vertical position and its angular attitude in both the vertical and horizontal planes, and for fixedly maintaining the blade in its adjusted position.

It is also an object of the invention to provide a shoulder spreading attachment including means facilitating mounting of the blade to extend from either side of the attachment frame, and means for operating the material discharging conveyor in either direction, whereby the attachment may readily be set up for spreading materials to either the right or the left. By virtue of this capability for reverse mounting of the blade, the spreader can work on either the right hand or the left hand shoulder of a divided highway without having to run counter to the normal flow of traffic on the highway.

A still further object of the invention is the provision of a shoulder spreader attachment including means facilitating transfer of road materials from dump trucks into the hopper of the attachment without spilling of the materials and without damage to the attachment.

Other objects and advantages of the invention will become apparent in the following detailed description.

Now, in order to acquaint those skilled in the art with the manners of making and using our improved shoulder spreader attachment, we shall describe, in connection with the accompanying drawings, preferred embodiments of our attachment and preferred manners of making and using the same.

In the drawings, wherein like reference numerals indicate like parts:

FIGURE 4 is a side elevational view of a portion of the attachment of FIGURE 1, illustrating a mechanism for supporting and vertically moving the strike-off blade, but with the strike-off blade removed, and also illustrating in side elevation a portion of the coupling structure between the attachment and the propelling vehicle;

FIGURE 5 is a sectional view taken substantially along line V—V of FIGURE 4;

FIGURE 6 is a sectional view taken substantially along line VI—VI of FIGURE 3;

FIGURE 7 is a sectional view taken substantially along line VII—VII of FIGURE 6;

FIGURE 8 is a top view of the attachment frame and hopper, portions of the apparatus being broken away to reveal certain interior parts;

FIGURE 9 is a fragmentary sectional view, taken substantially on line IX—IX of FIGURE 8, illustrating the improved apron provided according to our invention;

FIGURE 10 is a fragmentary plan view of a motor grader and our shoulder spreader attachment illustrating a steerable coupling between the motor grader and the attachment; and FIGURE 11 is a plan view of a second embodiment of our shoulder spreader attachment, illustrating the same as attached to and co-operating with a bulldozer.

Figure 1:
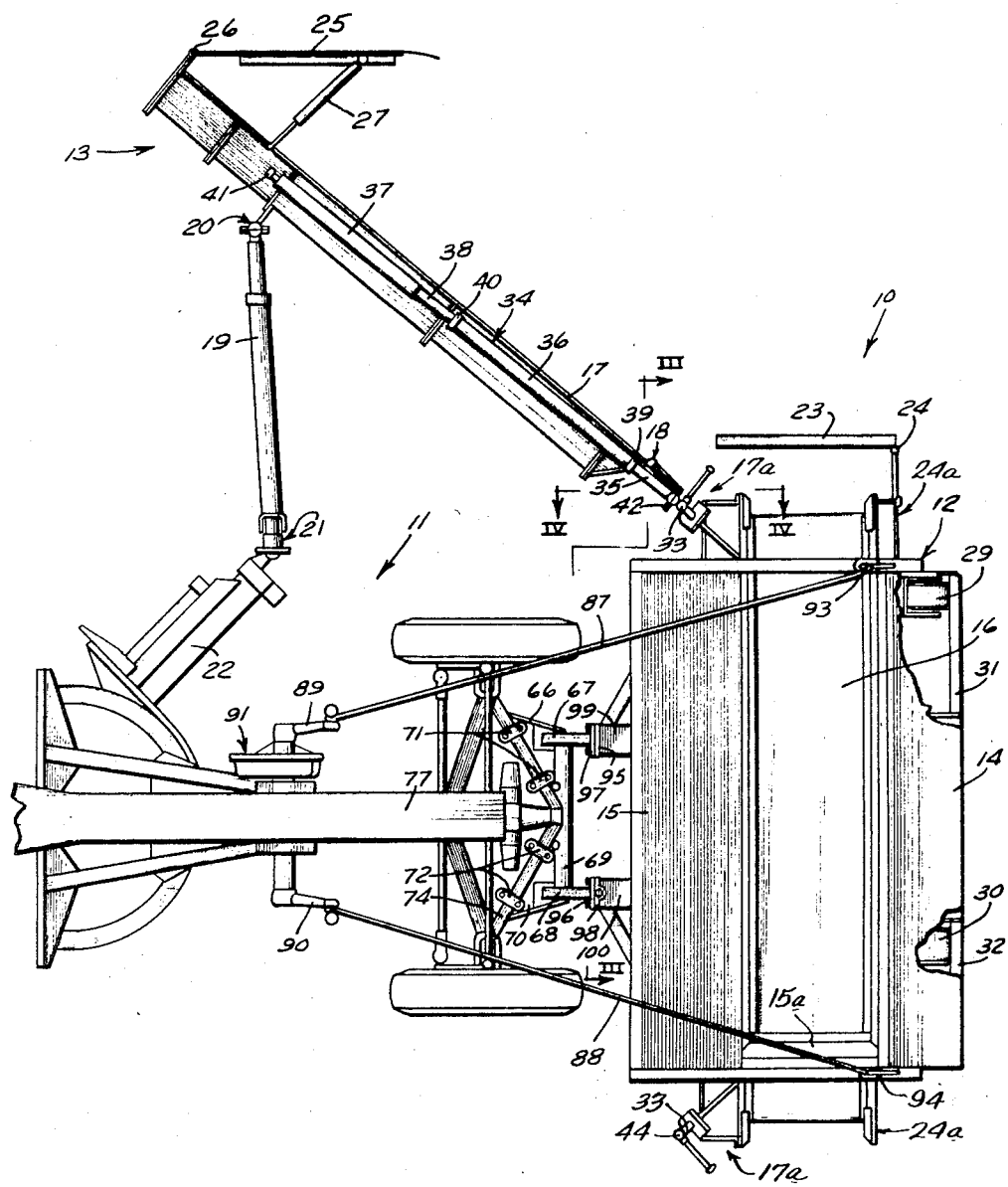
FIGURE 1 is a top plan view showing a shoulder spreader attachment constructed according to the invention mounted at the front of a motor grader.
Figure 2:
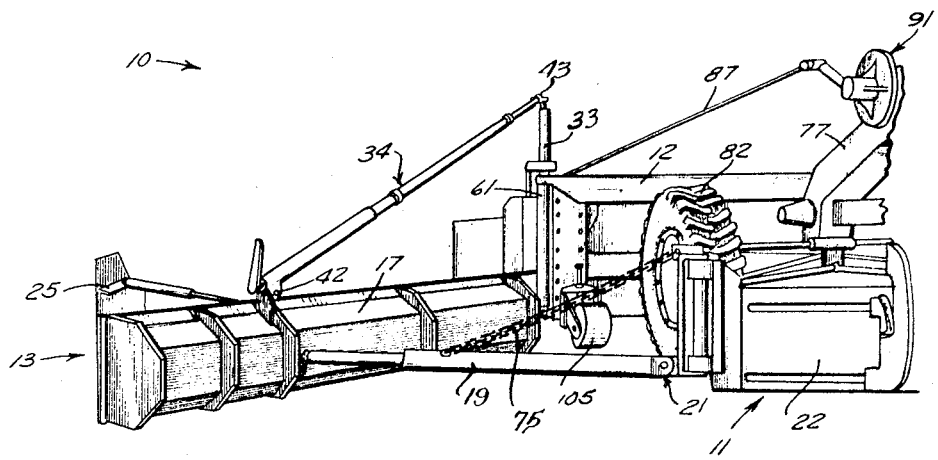
FIGURE 2 is a perspective view, from the left rear, of the attachment of FIGURE 1.
Figure 3:
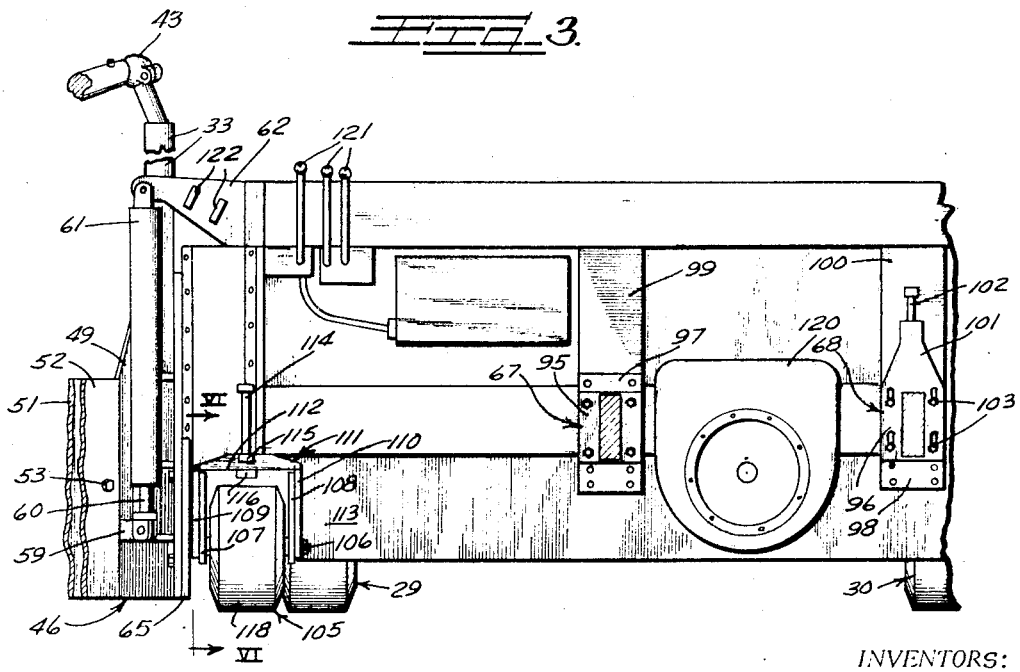
FIGURE 3 is a sectional view taken substantially along line III—III of FIGURE 1, illustrating in elevation the rearward end of the attachment.

Referring to FIGURES 1 to 3, numeral 10 generally designates a shoulder spreader attachment constructed according to the principles of this invention, connected in front of a standard motor grader 11 to be propelled and controlled therefrom, in movement over pavement.

In general, the attachment 10 comprises a rectangular frame structure 12 mounted in front of the grader 11 for movement over a road or highway, a strike-off blade assembly 13 projecting transversely from a rearward corner portion of the frame structure 12 for extension over the shoulder of the road or highway, a hopper defined within the frame by inclined walls 14 and 15 thereof, and a conveyor belt 16 defining the bottom of the hopper and arranged to be driven to deliver material sidewise in front of the strike-off blade 13.

The attachment frame 12 is in part supported for movement over the road or highway by a pair of wheels 29 and 30 provided in coaxial transversely spaced relation along the front of the frame 12. To insure a continuous supply of material in the hopper, dump trucks may be moved along the pavement ahead of the attachment, and a pair of rollers 31 and 32 are provided on the frame for pushing engagement with the rear wheels of the trucks.

The strike-off blade assembly 13 comprises a blade 17 supported at its inner end by a hinge 18 for pivotal movement about a vertical axis. Preferably, the blade is of sectionalized construction to accommodate variation in its length. To adjust and fix the angular position of the blade 17 in the horizontal plane, i.e., about the vertical axis of the hinge 18, an adjustable telescopic connector 19 is extended between the blade and the propelling vehicle. In the case of a motor grader, the connector or beam 19 is connected at one end to an outer point on the blade 17 by a ball and socket joint 20, and at its opposite end through a double hinge or universal assembly 21 to the outer end of the scraper blade 22 of the motor grader 11. The position of the blade 22 is controlled by the standard controls of the motor grader, thus to control the angular position of the strike-off blade 17 in the horizontal plane, the length of the telescopic connector 19 also being adjustable for this purpose.

In normal operation, the strike-off blade 17 extends angularly rearwardly, as shown in the drawings, with the material being supplied in front of the inner end of the blade to flow outwardly along the blade. To control the supply of material, the speed of operation of the conveyor belt 16 may be controlled, and an additional control is provided by a flow control gate 23 disposed outwardly from the end of the conveyor belt 16 and adjustably pivotal about the vertical axis of a hinge structure 24 detachably connected to a section 24a of the frame 12. At its outer end, the blade 17 carries a divider shoe 25 connected to the blade by a hinge 26, with an adjustable connector 27 between the shoe and the blade for adjusting the angular position of the shoe 25 relative to the blade.

An important feature of the invention relates to the provision of connection means 17a between the strike-off blade 17 and the frame 12 which includes means facilitating adjustment of the height and attitude of the blade 17 in the vertical plane. In the preferred embodiment of the invention, one such connection is provided at each side of the frame, as shown in FIGURE 1 and the blade is provided with cutting edge shoes or plates at both its upper and lower edges so that the blade can, by inversion thereof, be applied to either side of the frame 12. Since the connection means 17a are identical (except of opposite hand), a description of one will suffice.

Each connection 17a is characterized by an upright post 33 projecting above the upper level of the hopper or frame 12. At its lower end, the post is welded to a slide 46 which comprises a plate 47 having one edge welded to a second plate 48 at right angles thereto, and a third plate 49 welded to the plate 48 and extending at a 45 degree angle outwardly and rearwardly, the lower end of the post 33 being welded in the V defined by plates 47 and 49. The plate 49 pivotally mounts the inner end of the strike-off blade 17 on a horizontal axis, the plate being disposed between a pair of plates 51 and 52 which are secured to the hinge 18 and a bolt 53 extending through the plates 49, 51 and 52 to form the horizontal pivot axis. The plate 48 is movable in a vertical guideway defined by a vertical frame plate 54 and a pair of plates 55 and 56 bolted to the plate 54 and extending over outer and inner edge portions of the plate 48, the plates 55 and 56 being spaced from the frame plate 54 by spacer or bearing plates 57 and 58 having thicknesses slightly greater than the thickness of the plate 48.

To control vertical movement of the post 33 and the slide 46, a lug 59 welded to the rear face of the plate 49 is connected to the piston rod of a double-acting hydraulic ram 61, the cylinder of which is secured at its upper end to an outwardly projecting frame member 62.

After adjustment of the vertical position of the post and the slide 46, the post is rigidly fixed in place by a C-clamp 63 which is rigidly secured to the outer end of an outwardly and rearwardly projecting frame plate 64, and the slide 46 is rigidly bolted (via slots in the plate 47) to a frame plate 65. When loosened, the C-clamp 63 and the slide clamping bolts also serve as guides for the vertical movement of the post 33 and slide 46.

With this arrangement, the vertical height of the strike-off blade 17 may readily be adjusted hydraulically by the ram 61, after which its position may be rigidly fixed by the C-clamp 63.

To adjust the attitude or angle of the strike-off blade in the vertical plane, an adjustable stabilizer bar assembly 34 is extended between the upper end of the post 33 and an outer point of the blade 17. The stabilizer bar assembly 34 comprises an inner bar or pipe section 35 telescopically adjustable in the inner end portion of an intermediate pipe section 36, a second bar or pipe section 38 telescopically adjustable in the outer end portion of the section 36, and an outer pipe section 37 telescopically adjustable on the outer end of the pipe or bar 38. Clamps 39 and 40 are provided for fixing the position of the intermediate section 36 on the sections 35 and 38, and to fix the relative positions of the sections 37 and 38, a screw 41 extends into the outer end of the section 38 and is threaded into a nut (not shown) carried at the outer end of the section 38. In the initial set-up of the machine, the parts are adjusted to the approximate position which is desired by use of the clamps 39 and 40, and the final adjustment is performed by means of the screw 41. A suitable swivel connection 42 is provided between the outer end of the section 37 and the blade 17, as shown in the perspective view of FIGURE 2, while a ball socket assembly 43 is carried by the inner end of the section 35, to be clamped on a ball 44 rigidly carried at the upper end of the post 33.

Thus, the ram 61 and clamp 63 positively fix the vertical height of the strike-off; the stabilizer 34 positively fixes the vertical attitude of the strike-off about the horizontal axis 53; and the beam 19 positively fixes the attitude of the strike-off in the horizontal plane about the hinge 18; whereby the strike-off blade, once adjusted, is maintained in a rigidly fixed position relative to the frame 12.

A second important feature of the invention is the provision of a connection between the attachment frame 12 and the frame means of the motor grader or other propelling vehicle such as to utilize the vehicle in restraining the attachment against rocking movement about a longitudinally extending horizontal axis, and thereby positively to restrain the strike-off blade 17 from movement out of its intended position.

A mounting bracket 66, installed on the motor grader 11, is connected to a pair of brackets 67 and 68 projecting rearwardly from the attachment frame 12. Bracket 66 comprises a transversely extending rod or tube 69 welded to a plate 70, plate 70 being secured by pairs of clamp devices 71 and 72 to the steerable front axle 74 connected to and forming part of the frame 77 of the motor grader.

Brackets 67 and 68 define cylindrical recesses for receving the cylindrical rod 69, clamp members 86 extending under the rod and bolted to the brackets 67 and 68. The attachment frame 12 is thus pivotally mounted on the transverse tube 69 and may be tilted upwardly about the tube for transport or maneuvering. To tilt the frame, cables 87–88 are connected between arms 89–90 of the motor grader scarifier control 91 and links 93–94 on the frame 12. To raise the outer end of the strike-off blade, a chain 75 is extended diagonally between the horizontal strut 19 and the upper edge of the scraper blade 22, so that the conventional scraper blade controls govern the strike-off during maneuvering.

The frame 12 is thus supported at its forward end by the road engaging wheels 29 and 30 and at its rearward end on the frame of the motor grader or other propelling vehicle. To facilitate attachment of the spreader to the vehicle, the ram 61 may be utilized as a jack for raising the rearward portions of the frame whereby the vehicle may be driven up to the spreader to engage the tube 69 under the brackets 67 and 68. The clamp halves 86 may then be bolted to the brackets in encircling relation to the tube 69, whereafter the ram may be actuated to raise the blade and leave the attachment supported on the wheels 29 and 30 and the propelling vehicle.

The brackets 67 and 68 have flange portions 95 and 96 secured against vertical plates 97 and 98 secured to the rearward ends of frame structures 99 and 100 extending rearwardly from the frame 12. While both brackets 67 and 68 may be infinitely adjustable on the frame, only the bracket remote from the strike-off blade need be so adjustable. For this reason, we will describe the bracket 68 which is remote from the blade in FIGURE 1 as being infinitely adjustable, and will describe a simple mount for bracket 67. Specifically, the flange 95 of bracket 67 may be bolted in a fixed position on the plate 97, although its vertical position may be adjusted in steps to align the same with the mounting bracket on the motor grader by appropriate selection of holes in the plate 97 through which the bolts extend. The flange 96 is similarly mounted on the plate 98, except that the mounting bolts 103 therefor extend through vertical slots in the flange. The flange 96 includes a portion 101 extending upwardly and then inwardly to receive a vertical adjustment screw 102 which engages a horizontal surface of the frame structure 100, to permit infinitely variable adjustment of the vertical position of the bracket 68. When the adjustment is completed, bolts 103 are tightened to rigidly fix the position of the bracket.

Cooperating with the bracket 68 in performance of an attachment stabilizing function is an adjustable wheel 105, which is located at the rearward corner of the frame 12 from which the strike-off blade assembly 13 extends. The wheel 105 is journalled on a shaft 106 carried by a pair of arms 107 and 108 which are adjustably connected to legs 109 and 110 of a generally U-shaped bracket 111 having a bight portion 112 disposed against a vertical plate 113 forming part of the frame 12. The arms 107 and 108 are bolted to the legs 109 and 110 via a plurality of vertically spaced bolt holes to permit relative vertical adjustment in steps. An infinitely variable adjustment is also made possible by the provision of a vertical adjustment screw 114 threaded through a lug 115 on the plate 113 and engaged with a lug 116 on the upper end of the portion 112 of the bracket 111. To provide a guide for such vertical movement, bolts 117 extend through vertical slots in the portion 112 and are threaded into the plate 113. After adjustment of the wheel 105 to the desired vertical position relative to the frame 12, the bolts 117 are tightened, to rigidly fix the position.

In an attachment such as shown in FIGURE 1, wherein the strike-off may extend from either side of the frame 12, a wheel 105 is preferably provided at each rear corner of the frame, but it is only the wheel adjacent the strike-off that is considered operative in the present context. Each wheel 105 preferably has a hard rubber tire 118 affording sufficient frictional contact with the pavement to prevent sidewise movement of the attachment, but having sufficient rigidity to fix the vertical position within close limits.

In setting up the machine for operation, the bracket 66 is mounted on the motor grader 11, and the brackets 67 and 68 are bolted on the hopper frame to line-up with the bar or tube 69. The hydraulic ram 61 is then operated to move the slide 46 downwardly into engagement with the pavement and to jack up the rear of the attachment frame into a position as required for the brackets 67 and 68 to fit over the rod or tube 69. The motor grader is then driven up to the attachment, and the ram 61 is operated to move the slide 46 upwardly and thereby lower the frame to engage the brackets 67 and 68 over the tube 69. Clamps 86 are then bolted to the brackets 67 and 68.

To adjust the machine for stability, the strike-off blade is placed in approximate operating position, clamps 39 and 40 are tightened and the ram 61 is operated to cause the entire weight of the strike-off blade assembly 13 to be carried by the attachment frame 12. The adjustment screw 102 on the fully adjustable bracket 68 is then tightened until the front wheel 29 or 30 opposite the strike-off is firmly on the pavement, after which the bolts for both brackets 67 and 68 are securely tightened. The appropriate screw 114 is then adjusted to bring the wheel 105 adjacent the strike-off firmly against the pavement.

The hydraulic ram 61 may then be operated to set the strike-off blade at the proper height; the length of the stabilizer bar 34 may be adjusted by the clamps 39 and 40 and the screw 41 to position the strike-off blade 17 at the proper angle in the vertical plane; and the motor grader blade 22 and/or the beam 19 may be adjusted to set the strike-off blade 17 at the proper angle in the horizontal plane. After the adjustment is completed, and all of the clamps are tightened, the blade 17 will not move from its adjusted position.

Specifically, the strike-off blade 17 will not move vertically downward, either bodily or tiltably, since the same is rigidly connected to the frame 12 by the rigid post 33 and the rigid stabilizer 34, and the rearward corner of the frame from which the strike-off extends is rigidly supported by the wheel 105. The strike-off blade will not move vertically upward, either bodily or tiltably, because the blade is rigidly connected to and supported by the frame and any tendency of the frame to rise is counteracted by the force couple defined by the long lever arm between the wheel 105 and the bracket 68, both of which have been so adjusted and clamped as to permit no lost movement or "play" therebetween. Since the strike-off extends laterally outward from the rearward portions of the frame, any tendency of the same to rise or fall will tend to tilt the frame 12 about the longitudinal centerline of the motor grader, and any such tilting movement is thoroughly counteracted by the wheel 105, the clamp 68 and the entire structure of the motor grader. In addition, any tendency of the strike-off to depart from its adjusted position in the horizontal plane will be firmly and thoroughly resisted by the rigid interconnection of the inner end of the strike-off and the attachment frame, and the rigid interconnection provided by the beam 19 between the outer end portions of the strike-off and the rigid scraper blade 22 of the motor grader. Thus, the strike-off is rigidly fixed in position to perform its intended functions.

Further to assure accuracy of the strike-off function, the present invention so couples the strike-off blade to the motor grader that customarily occurring deflections and/or rocking movements of the motor grader or propelling vehicle are not transmitted to the strike-off blade, and variable loading of the spreading attachment does not result in deflection of either the propelling vehicle or the strike-off blade. Specifically, the brackets 67 and 68 are not locked in adjusted position until after the attachment frame has been connected to and properly located relative to the motor grader. Thus, the degrees of inflation of the front wheels of the motor grader are automatically compensated for and those wheels, in their existing condition, take and support the dead weight of the motor grader and the shoulder spreader attachment. The wheel 105 on the strike-off blade side of the attachment is then screwed down into firm engagement with the pavement, whereby to fix the relative elevations of the front of the motor grader and the attachment frame. The wheel 105 on the other side of the frame is then also screwed down into firm engagement with the pavement to supplement the first wheel in performance of this latter function. Consequently, variable loading of the hopper with material, and sudden dumping of material into the hopper will not affect the elevation or attitude of the attachment frame or the front of the motor grader. Similarly, "setting-down" of the propelling vehicle (i.e., the tendency of the vehicle to push downward and to flatten or deflect its tires) as it takes on a greater pushing load, is necessarily restricted to the rear of the vehicle as the front elevation thereof is now rigidly fixed.

To compensate for "setting-down" of the rear of the vehicle, and other deflections and rocking movements occasioned by the vehicle in its travel, the chain 75 is loosened relative to the scraper blade 22 and left completely slack during shouldering operations, and the strut 19 is connected to the vehicle by the assembly 21 which includes both a vertical hinge pin or pivot axis and a horizontal hinge pin or pivot axis. Due particularly to the horizontal pivot, the lost motion of the chain relative to the strut, and also the ball and socket connection 20, no sensible or significant degree of movement is transmitted to the strike-off blade upon deflection or rocking of the propelling vehicle.

Because the strike-off blade is thus maintained in a fixed position of adjustment, the blade is ideally suited for shoulder preparation prior to spreading of shoulder surfacing materials. Specifically, the blade may be used to smooth and level the shoulder to facilitate the subsequent spreading of sand, gravel and/or black-top thereon, the blade scraping away high spots and using the earth thus accumulated before it to fill low spots whereby a smooth subsurface is prepared for application of a uniform layer of surfacing material. Also, since the strike-off blade is fully adjustable vertically and horizontally, the same is ideally suited to trenching or cutting away part of a shoulder adjacent existing pavement for purposes of widening narrow roads, the divider shoe 25 being removed during trenching operations to permit the excavated earth to flow outwardly or spill off the end of the blade.

Despite the rigidity of the strike-off in its operative position, the same can readily be raised to pass over any obstruction in its path (such as a culvert or intersecting roadway) by actuating the ram 61. Also, the entire attachment, including the strike-off blade, can be lifted over obstructions in its path by tightening the chain 75 and operating the scraper blade and scarifier control mechanisms of the motor grader to lift the entire spreader attachment upwardly about the tube 69.

As previously explained, the strike-off blade 17, by inversion thereof, may be mounted on either of the connection means 17a to extend laterally outward from either side of the frame 12 and the propelling vehicle 11, thereby to facilitate work on either the right hand or left hand shoulder of a divided highway or expressway while the apparatus moves in the same direction as highway traffic, rather than having to travel counter to such traffic which is extremely hazardous. The alternative extension of the blade commends alternative drive of the conveyor belt 16, since we have found that the belt is best driven from the head end thereof in the direction of discharge of material from the hopper.

To drive the conveyor belt, and to render the attachment self-contained, we provide, as shown in FIGURE 8, a gasoline engine 120 which drives a hydraulic pump 125 to supply fluid under pressure to the strike-off adjusting ram 61 and a belt-driving hydraulic motor or clutch 126. If the strike-off extends to the right, the motor is connected via pulley 127, belts 128 and pulley 129 to a gear box 130 that is mounted on the frame 12 adjacent the right hand side thereof. The gear box 130 includes an output shaft 131 which is connected by a detachable coupling 132 to the roller 133 which supports the conveyor belt 16 at the right hand side of the attachment. In this manner, when the conveyor belt is to discharge materials to the right hand side of the machine, the conveyor belt is driven from the head end supporting roller therefore, whereby to effect efficient and readily controllable discharge of material in front of the strike-off blade.

A similar gear box, but of opposite hand, is provided at the left hand side of the machine frame for driving the belt supporting pulley at the left hand side of the frame when material discharge is to be effected to the left side. Since the gear box and its components are the same as those provided at the right hand side of the machine, the left hand components have been indicated by the same reference numerals. When material discharge is to be effected from the right hand side of the machine, and the components at the right side of the machine are connected as above described, it is preferable that the left hand roller 133 be disconnected from the left hand gear box 130. To effect this result, the coupling 132 at the left side of the machine is preferably disconnected. When material discharge is to be effected to the left side of the attachment, the coupling 132 at the right is disconnected, the coupling 132 at the left is connected, and the belts 128 are removed from the right hand pulley 129 and connected to the left hand pulley 129. Also, a removable and reversible side wall member or gate 15a (FIGURE 1) is inserted in the end of the frame 12 opposite that through which the material is to be discharged.

To control operation of the conveyor belt 16, and also to control operation of the ram 61, suitable manually operated controls 121 are provided. Such controls may be operated from the cab of the propelling vehicle, through a remote control mechanism, or may be directly operated by an operator who may sit on a seat suspended from a pair of lugs 122 on the frame 12. Lugs 122 are provided adjacent both sides of the attachment frame, and two pairs of controls 121 are mechanically interconnected so that the operator may sit adjacent the side of the attachment from which the strike-off extends, thereby to observe the spreading operation and effect proper control of the conveyor 16.

As illustrated in FIGURE 8, the conveyor belt 16 is supported between the rolls 133 by a plurality of support rollers 134 extending across the bottom of the hopper below the belt. To keep the conveyor belt clear, a scraper 135 is extended diagonally of the frame in a position to contact the upper surface of the lower run of the belt during its travel.

With this type of equipment, as was explained herein before, it is intended that dump trucks be positioned ahead of the spreader with their wheels engaging the rollers 31 and 32 whereby the dump truck may be pushed ahead of the spreader by the propelling vehicle or motor grader 11 so that the dump body of the truck will be maintained properly aligned with the hopper during the period that materials are being dumped from the truck into the hopper. To facilitate co-operative relation between the dump body of the trucks, taking into consideration the differences in the structure of the trucks and the fact that they are frequently driven away from the attachment, after unloading, with the dump bodies thereof in elevated position, we provide an improved inclined front wall 14 for the hopper in the form of a movable apron.

Specifically, as shown in FIGURES 8 and 9, the inner or rear edge portion of the wall or apron 14 is slidably mounted on an abbreviated inclined wall portion 14a of the hopper structure. A tension spring 136 is extended between the apron 14 and an appropriate portion of the frame 12 at each side of the apron to pull the apron forwardly and downwardly into a normal position wherein it will conveniently extend beneath the dump body of any dump truck to be engaged with the spreader attachment. The normal downward limit of said normal position is adjustably set by a flexible strut comprised of a relatively stiff spring 137 and a length of chain 138 extending between an upper portion of the frame 12 and the outer or forward edge portion of the apron 14 adjacent each side of the frame. The links of each chain 138 are adapted to be detachably entered into a slot in an adjacent apron bracket to adjustably set the normal downward limit of apron movement. The forward limit is set by a chain 139 extending between the frame wall 14a and the forward edge of the apron 14 adjacent each side of the frame.

The springs 136 and 137 thus mount and maintain the apron in operative association with the frame 12 and the material hopper, and yet accommodate movement of the apron in and out and up and down whereby the apron is self-adjusting with respect to all of the dump trucks used in co-operation with the attachment. Should a dump truck pull away from the attachment with its dump body tilted so that the body strikes the apron 14, springs 137 will yield and permit the truck body to clear the apron without damage to the truck, the apron or the attachment.

In use, the propelling vehicle pushes the spreader attachment forwardly in direct alignment with it, and the attachment in turn pushes the dump trucks in front of it in the same path of alignment. It is thus imperative that the operator of the propelling vehicle or motor grader 11 have reliable means for properly guiding the vehicle, the attachment and the trucks relative to the shoulder. Heretofore, this has presented a substantial problem in the art, but the present invention provides a simple yet highly reliable solution. Specifically, a transverse horizontal rod 224 (see FIGURE 8) is integrated with each of the frame parts 24a. Slidably and rotatably mounted on each rod 224 is a tubular clamp 225 including an integral radially extending rod 226. Adjustably mounted on each rod 226, by clamps 227, is a wear plate 228 which is adapted to engage the side edge of the pavement over which the propelling vehicle 11, the attachment frame 12 and the dump trucks travel. When not in use, each plate 228 and its associated rod 226 may be swung to a vertically upwardly extending out-of-the-way position as shown for the right hand assembly in FIGURE 8, and each may readily be swung to a vertically depending operative position, as shown at the left in FIGURE 8, by simple adjustment of the respective tubular clamp 225. Also, the lateral position of each guide plate 228 is readily adjusted by the clamp 225.

In use, the wear plate 228 at the side of the attachment frame from which the strike-off blade extends is lowered into operative position and adjusted laterally on the rod 224 and vertically on the rod 226 so that the inwardly facing wearing surface of the plate engages the side edges of the pavement adjacent the shoulder being formed when the blade is in properly adjusted position, whereafter the guide 228 is firmly locked in its adjusted position. Thereafter, the operator of the propelling vehicle need only maintain a slight steering pressure in the direction away from the shoulder to keep the wear plate in engagement with the edge of the pavement, and thereby positively and accurately guide the entire shouldering operation without fear of error and without guesswork.

Because the wear plate 228 is mounted at the very front of the spreading attachment ahead of the strike-off blade 13 and the conveyor 16, the wear plate may be used for all shouldering operations, even final finishing, since the guide precedes the strike-off and the conveyor and thus cannot interfere with the spreading operation or disrupt the finished shoulder. Also, the shoulder material being spread cannot wedge between the guide and the pavement to disrupt the accurate guidance of the attachment. The relatively long lever arm between the guide plate 228 and the propelling vehicle assures an effective force couple for maintaining (in combination with the coupling means 66–67–68) the vehicle in proper alignment with the attachment and the edge of the pavement.

The fact that the bracket 66, and thus the attachment frame 12, are mounted on the front steering axle of the motor grader provides adequate steering for the attachment, especially on highways and expressways where curves are usually very gradual. However, in other types of road work, such as entries and exits from expressways, county and township roads, etc., particularly sharp curves may be encountered and in such instances it would be desirable if the shoulder spreading attachment could be steered independently, and not be reliant on the steering capability of the motor grader alone. To this end, we have provided a steerable connection or coupling means for our shoulder spreading attachment that permits independent steering of the attachment, and yet attains all of the functions and capabilities, particularly the stabilizing effect, of the coupling means 67, 68, 105, previously described.

As shown in FIGURE 10, brackets 67a and 68a similar to the brackets 67 and 68 previously described and adapted to be connected to the tube 69 of the bracket 66 on the motor grader 11, are in this case interconnected by a rigid crossbeam 140. Pivotally connected to the center of this crossbeam 140, suitably by a bearing structure 141, is a second rigid crossbeam 142 which is of generally U-shape. At the ends of the legs thereof, at points aligned with the brackets 67a and 68a, the crossbeam 142 is provided with vertical flanges 96a, flange extensions 101a and adjusting screws 102a adapted to be connected to the spreader attachment in substantially the same manner and for the express purpose described in connection with the flange 96, extension 101 and adjusting screw 102 of the bracket 68 previously described. Thus, the spreader attachment is adapted to be connected to the motor grader or other propelling vehicle in exactly the same manner as previously described, with the exception that a vertical pivot is now provided between the motor grader and the spreader attachment by virtue of the beams 140 and 142 and the bearing assembly 141.

Immediately outward of each flange 96a, the beam 142 is provided with brackets 143 providing a clevis 144 for reception on a vertical pivot axis of the cylinder of a respective hydraulic ram 145. As illustrated, the rams 145 extend beneath and into the free space defined by the inclined rear wall 15 of the material receiving hopper of the attachment. Each ram includes an extensible and retractable piston rod 146 extending rearwardly toward the motor grader and pivotally connected at its rearward end to a mounting bracket or clevis 147 provided at the respective end of the beam 140. Consequently, by opposite actuation of the two rams 145, the beam 142 and the shoulder spreading attachment may be pivoted about the bearing 141 relative to the beam 140 and the motor grader 11 or other propelling vehicle. By using two double acting hydraulic rams, a rigid connection is established between the motor grader and the spreading attachment in each position of adjustment of the rams 145. Also, the particular connection affords absolute rigidity in the direction transversely thereof, thereby to retain the strike-off stabilizing function of the brackets 67 and 68 previously described.

While the apparatus previous described herein, and illustrated in FIGURES 1 through 10, has been shown and described as associated with and propelled by a motor grader, it is to be appreciated that the same structure may be associated with a crawler tractor or a rubber-tired tractor in substantially the same manner as previously described to attain substantially the same results. The only change that would be required would be to extend the beam 19 from the strike-off blade to the frame of the tractor, since such tractor would not be equipped with the same scraper blade as a motor grader. However, if the tractor is equipped with a relatively massive bulldozer blade and blade manipulating frame and ram srtucture, it may prove desirable not to remove this blade structure to accommodate connection of the shoulder spreading attachment of this invention directly to the tractor frame. In such cases, we prefer to associate our attachment with the bulldozer blade in such manner that the bulldozer blade, frame and rams become, in effect, part of our attachment.

Referring to FIGURE 11, we have shown our attachment united with a bulldozer of the rubber-tire tractor type. As shown, the attachment is comprised of a frame and hopper structure 12 and strike-off blade assembly 13 essentially the same as previously described, with the exception that each is individually attached to the bulldozer blade, whereby the blade in effect becomes part of the attachment.

As is known, the bulldozer is comprised of a tractor 151, a C-frame 152 encompassing the frontal portions of the tractor, pivot means 153 universally mounting the rearward ends of the side arms of the C-frame and including hydraulic rams 154 for raising and lowering the rearward ends of the C-frame arms to cause tilting of the C-frame, a pair of hydraulic rams 155 extending between the tractor body and the front cross member of the C-frame for bodily raising and lowering the C-frame, a bulldozer blade 156 pivotally connected at its ends to the C-frame, and a hydraulic ram 157 centrally of the C-frame and blade for tilting the blade forwardly and backwardly relative to the C-frame.

To facilitate use of the bulldozer with the shoulder spreading attachment of this invention, we prefer to equip the blade with wheels 160 so that the bulldozer blade will be properly guided with respect to the pavement over which the tractor is riding, and also to provide means positively preventing inadvertent engagement of the bulldozer blade with the pavement. Suitably, the wheels 160 are journalled in clevises 161 which may be bolted or otherwise secured to the lower edge portions of the bulldozer blade 156.

At its upper edge, the bulldozer blade is provided with a pair of mounting brackets 162, which may be bolted to the blade, each adapted to pivotally mount a respective bracket 163. Each bracket 163 comprises a vertically elongated member pivotally connected to the respective bracket 162 at its upper end and including a lower end portion adapted to be abutted against the moldboard face of the blade and including flange portions 164 adapted to be detachably secured to the plate portions 97 and 98 of the attachment frame members 99 and 100 previously described. In this manner, the hopper structure 12 is detachably mounted on the bulldozer blade to be propelled by the tractor forwardly of the blade.

In the FIGURE 11 embodiment of the invention, the strike-off blade assembly 13 is preferably seccured directly to the bulldozer blade structure so as to derive support and rigidity from the massive bulldozer blade structure and the double acting hydraulic rams or jacks utilized for positioning and maintaining the position of the bulldozer blade. Specifically, the strike-off blade assembly 13 is adapted to be adjustably connected to the bulldozer blade by connection means 17a essentially identical to the connection means previously described, with the exception that said means includes a base plate 165 facilitating detachable securement of the connection to the outer side face of the bulldozer blade. Connection means 17a of opposite hand are preferably provided to facilitate extension of the strike-off blade assembly 13 from either side of the vehicle. In FIGURE 11, both connection means 17a are illustrated as affixed to the bulldozer blade, but it is to be appreciated that only one need be employed at a time depending upon the direction in which the shoulder material is to be spread.

We have chosen to illustrate two connection means 17a associated with the bulldozer blade for the reason that a strike-off blade assembly 13 may be extended from either or both sides of the bulldozer blade to impart substantially enhanced capabilities to the bulldozer when it is utilized in a purely bulldozing function, i.e., when the attachment 12, the wheels 160 and the brackets 163 are removed from the blade. Specifically, one or two strike-off assemblies 13 may be utilized in conjunction with the bulldozer blade to increase the operating width of the bulldozer in a single pass and/or to facilitate appropriate distribution and spreading of excess materials spilling off the bulldozer blade during a bulldozing function.

Also, in the above described condition, i.e., with the attachment frame 12 removed and a strike-off extending from either side thereof and fully adjustable relative to the bulldozer blade, the bulldozer is ideally suited for shoulder preparation, trenching, etc. as previously described; with the added advantage that the frame 12 may be removed. In particular, since the bulldozer blade 156 is positively located on the pavement by the wheels 160 and held in such position by the massive C-frame 152 and rams 155, the strike-off 13 may be utilized as a coring tool to accurately prepare shoulder sub-grades or trenches.

Whether the strike-off assembly 13 be utilized for shoulder spreading purposes, for shoulder preparation, or to enhance a bulldozing function, the outer end portions of the strike-off assembly are interconnected with the C-frame 152 of the bulldozer by a generally horizontal, telescopically adjustable, rigid strut or beam 19 of essentially the same structure as the beam 19 previously described. The beam preferably has a universal connection with the strike-off blade at its outer end, and a ball and socket connection with the C-frame 152 at its inner end, the latter ball and socket being provided at the rearward end of the side arm of the C-frame and serving the same function as the connection 21 previously described. In particular, since the wheels 160 are engaged with the pavement and the ball and socket provides a horizontal pivot axis, the strike-off 13 is essentially isolated from deflections and rocking movements occasioned by the tractor in its travel.

To facilitate adjustment of the outer end portion of the strike-off blade 13, and proper support thereof during transport and maneuvering, a double-acting hydraulic ram 166 is extended diagonally between the beam 19 and the frame of the tractor for adjusting the angle of the blade in the horizontal plane and for raising and lowering the beam and the blade. The ram has a lost-motion connection via slot 167 with the beam 19 and is normally relaxed or deenergized during shouldering operations so as not to transmit deflections or rocking movements from the tractor to the strike-off. At its inner upper end, the ram 166 is universally connected to the frame of the tractor by a ball and socket joint and a similar joint is provided between the ram and the lost-motion connection 167.

The beam 19 includes a clamp 168 which may be loosened to accommodate adjustment of the beam and thus adjustment of the horizontal angle of the strike-off blade and which may be tightened to lock the beam and blade in adjusted position. When the clamp 168 is loosened, the ram 166 is operable to lengthen and contract the beam, thereby to adjust the blade angle; and when the clamp is tightened, the ram is operable to raise and lower the strike-off blade, whereby the ram serves multiple purposes.

From the foregoing description, it will be apparent to those skilled in the art that the shoulder spreading attachment of FIGURE 11 attains the same advantageous results as the embodiment of the invention described in connection with FIGURES 1 to 10, and does so in substantially the same manner. In addition, the structure of FIGURE 11 facilitates use of one or two of the strike-off assemblies in connection with a bulldozer blade to co-operate with the latter in performance of particularly enhanced bulldozing and shouldering capabilities.

It is thus clear that all of the objects and advantages of the invention have been shown herein to be attained in a convenient, economical and practical manner.

While we have shown and described what we regard to be the preferred embodiments of our invention, it will be appreciated that various changes, rearrangerents and modifications may be made therein without departing from the scope of the invention, as defined by the appended claims.

We claim:

1. In a shoulder spreader or the like having an outwardly projecting strike-off blade, connection means for said strike-off blade comprising a frame adjacent one end of said blade, an upright post vertically adjustable on said frame, an upright plate secured to and extending laterally outward from adjacent the bottom of said post, a pair of upright plates receiving the first-named plate therebetween, a horizontal pivot pin connecting said plates and mounting said pair of plates for vertical tilting movement relative to said post, an upright hinge interconnecting said pair of plates and said blades, and a longitudinally adjustable rigid strut extending between the upper end portions of said post and a portion of the blade spaced outwardly from said hinge.

2. In a shoulder spreader or the like according to claim 1 a double acting hydraulic ram generally parallelling said post and connected at its opposite ends to said post and said frame.

3. In a shoulder spreader or the like as set forth in claim 1, wherein said blade projects outwardly from the front of a propelling vehicle and said frame means is mounted on the propelling vehicle; a second longitudinally adjustable rigid strut extending from said portion of the blade to the propelling vehicle rearwardly of said post.

4. In a shoulder spreader attachment for operation in front of a propelling vehicle, a frame extending transversely across the front of the vehicle, coupling means at the rear of said frame for connection to the propelling vehicle and including means for preventing transverse rocking movement between said frame and the vehicle, a strike-off blade projecting transversely from a rear corner portion of said frame, means connecting said strike-off blade to said rear corner of said frame and including means for restraining said strike-off blade against vertical movement relative to said frame, means for supporting said frame including a wheel located at said rear corner of said frame, the transversely extending portions of said frame between said wheel and said coupling means comprising a lever arm generally in the plane of the connection between said blade and said frame for counteracting vertical movement of said blade, and means for adjusting at least one of said coupling means and said wheel for eliminating play therebetween in the vertical transverse plane of said coupling means, said wheel and said connecting means.

5. In a shoulder spreader attachment as set forth in claim 4, said coupling means including means defining a transverse pivot axis between the vehicle and the frame to accommodate raising and lowering of the attachment.

6. In a shoulder spreader attachment as set forth in claim 4, said coupling means including first and second members connected respectively to said frame and the propelling vehicle and pivotally connected to one another on a upright axis, and means for pivoting said members relative to one another about said axis.

7. In a shoulder spreading attachment as set forth in claim 4, longitudinally adjustable rigid strut means extending from the outer end portions of the strike-off blade to the vehicle for restraining relative horizontal movement of the strike-off blade, said strut means having a self-adjusting connection with the vehicle for mitigating transmission of deflections of the vehicle to the strike-off blade.

8. In a shoulder spreader attachment as set forth in claim 4, said coupling means including means defining a transverse pivot axis between the vehicle and the frame adjacent the lower end of the frame, and means extending between the upper portions of the frame and the vehicle for raising and lowering the attachment about said pivot axis.

9. In a shoulder spreader attachment for operation in front of a propelling vehicle, means steerably connecting the attachment to the vehicle comprising a first member connected to the front of the vehicle and restrained relative to the vehicle against horizontal movement and against vertical movement in the plane transverse to the vehicle, a second member connected to the rear of the attachment and restrained relative to the attachment against horizonal movement and against vertical movement in the plane transverse to the vehicle, a generally upright bearing assembly pivotally interconnecting said members and restraining the same against other than relative pivotal movement about said bearing, and extensible and retractable means extending between said members in spaced relation to said bearing for accommodating relative pivotal movement of said members and for retaining said members in pivotally adjusted positions.

10. In a shoulder spreader attachment for operation in front of a propelling vehicle, means steerably connecting the attachment to the vehicle comprising a first member connected to the vehicle, a second member connected to the attachment, a pivot assembly pivotally interconnecting said members on a generally upright axis, and extensible and retractable means extending between said members in spaced relation to said pivot assembly for pivoting said members relative to one another about said axis.

11. In a shoulder spreader attachment for operation in front of a propelling vehicle having frame means, attachment frame means extending transversely across the front of the vehicle, coupling means extending rearwardly from said attachment frame means for connection to the propelling vehicle frame means, hopper means on said attachment frame means for receiving material to be spread, conveyor means in the bottom of said hopper means extending transversely of the vehicle for discharging the material sidewise from the hopper means and laterally outward from the frame means, means for operating said conveyor means in opposite directions for discharging the material selectively to one side or the other of the frame means, connection means on said frame means rearwardlly of said conveyor means adjacent each side of said hopper means, a strike-off blade selectively mountable on one or the other of said connection means for laterally outward projection from the side of said frame means to which the material is discharged, said connection means each comprising an upright post vertically adjustable on said frame means and means adjacent the bottom of said post for connection with a respective end of said blade and for mounting said blade for vertical and horizontal tilting movement relative to said post, a longitudinally adjustable rigid strut extending between the upper end portions of the post to which the blade is connected and a portion of the blade spaced from said post, and a second longitudinally adjustable rigid strut extending from a portion of the blade spaced from said post to said frame means rearwardly of said post, said blade and said struts being shiftable from one to the other of said connection means and said conveyor means being operable in one or the other direction to accommodate spreading of material to either side of the vehicle.

12. In a shoulder spreader attachment as set forth in claim 11, said coupling means including means for preventing transverse rocking movement between the attachment and the propelling vehicle, a ground engaging frame supporting wheel beneath each of said connection means, the transversely extending portions of the attachment frame means between each wheel and said coupling means comprising a lever arm for counteracting vertical movement of said blade, and means for adjusting at least one of said coupling means and the wheel beneath the connection means to which said blade is mounted for rendering the respective lever arm rigid in the vertical transverse plane of said coupling means, said wheel and said connection means between the point on the ground engaged by said wheel and said coupling means.

13. Shoulder spreader attachment means for a bulldozer including a propelling vehicle and a bulldozer blade comprising an attachment frame, means extending rearwardly from the attachment frame for connection to the bulldozer blade to cause the attachment frame to be propelled ahead of the bulldozer blade, hopper means on said attachment frame for receiving material to be spread, conveyor means in the bottom of said hopper means for discharging the material sidewise from the hopper means and laterally outward from said frame and the bulldozer, means for operating said conveyor means in opposite directions for discharging the material selectively to each side of the frame and the bulldozer, a strike-off blade projecting laterally outward from the side of the bulldozer to which the material is discharged, connection means mounted on the end of the bulldozer blade adjacent the side of the bulldozer to which the material is discharged, said connection means connecting said strike-off blade to the bulldozer blade for vertical and horizontal tilting movement of the strike-off blade relative to the bulldozer blade, longitudinally adjustable rigid strut means extending between the outer end portions of the strike-off blade and upper portions of the bulldozer blade for restraining the strike-off blade against relative movement in the vertical plane, and second longitudinally adjustable rigid strut means extending from the outer end portions of the blade to the bulldozer for restraining horizontal movement of the strike-off blade relative to the bulldozer.

14. Attachment means for a bulldozer including a propelling vehicle and a bulldozer blade, comprising a strike-off blade projecting laterally outward from the bulldozer, ground engaging supporting wheels on the bulldozer blade, connection means on one end of the bulldozer blade for mounting the strike-off blade, said connection means including means mounting the inner end of the strike-off blade on the bulldozer blade for vertical adjustment and for vertical and horizontal tilting movement relative to the bulldozer blade, longitudinally adjustable rigid strut means extending diagonally between the outer end portions of the strike-off blade and upper portions of the bulldozer blade for restraining the strike-off blade against relative tilting movement in the vertical plane, second longitudinally adjustable rigid strut means extending generally horizontally from the outer end portions of the strike-off blade to the vehicle for restraining relative horizontal movement of the strike-off blade, said second strut means having a self-adjusting connection with the vehicle for mitigating transmission of deflections of the vehicle to the strike-off blade, and third strut means extending diagonally between the vehicle and said second strut means for lifting the outer end portions of said strike-off blade, the latter means normally having lost motion relative to said second strut means for mitigating transmission of deflections of the vehicle to the strike-off blade.

15. Shoulder attachment means for a road building machine comprising a strike-off blade projecting laterally outward from the machine, connection means mounting the inner end of the strike-off blade on the machine for vertical adjustment and for vertical and horizontal tilting movement relative to the machine, said connection means including upright means extending above the strike-off blade, longitudinally adjustable rigid strut means extending diagonally between the outer end portions of the strike-off blade and said upright means for restraining the strike-off blade against relative tilting movement in the vertical plane, second longitudinally adjustable rigid strut means extending generally horizontally from the outer end portions of the strike-off blade to the vehicle for restraining relative horizontal movement of the strike-off blade, said second strut means having a self-adjusting connection with the vehicle for mitigating transmission of deflections of the vehicle to the strike-off blade, and third strut means extending diagonally between the vehicle and said second strut means for lifting the outer end portions of said strike-off blade, the latter means normally having lost motion relative to said second strut means for mitigating transmission of deflections of the vehicle to the strike-off blade.

16. In a shoulder spreading attachment for operation in front of a propelling vehicle operating on existing pavement, an attachment frame, coupling means connecting said frame to the vehicle for movement over the pavement ahead of the vehicle, said coupling means including members spaced transversely of the vehicle rigidly connecting the frame to the vehicle in the horizontal plane and preventing tilting of the frame relative to the vehicle in the horizontal plane, a strike-off blade projecting laterally outward from a rearward corner portion of said frame, and a rigid guide plate adjustably mounted on and depending below the front corner portion of said frame ahead of said strike-off blade for engaging the side edge of the pavement and physically guiding movement of both the frame and the vehicle.

17. In a shoulder spreader attachment for operation in front of a propelling vehicle and having an attachment frame, hopper means on said attachment frame for receiving material from dump trucks, and means on said attachment frame for pushing a truck forwardly thereof while material is being dumped from the truck into the hopper; a forwardly projecting apron movably mounted on said frame and comprising an upwardly, downwardly, inwardly and outwardly adjustable front wall for said hopper, and means for movably mounting said apron on said frame for self-adjusting movement relative to the dump bodies of trucks passing thereover; said means comprising adjustable stop means normally limiting downward and forward movement of said apron and yieldable means normally biasing said apron to the normal downward and forward limit determined by said stop means, said stop means and said biasing means yieldably accommodating upward and rearward movement of the apron should contact between a truck and the apron produce such movement, said stop means including means yieldably accommodating downward movement of said apron below said normal limit should contact between a truck and the apron produce such movement.

18. In a shoulder spreader attachment for operation in front of a propelling vehicle and having an attachment frame, hopper means on said attachment frame for receiving material from dump trucks, and means on said attachment frame for pushing a truck forwardly thereof while material is being dumped from the truck into the hopper; an apron movably mounted on said frame and comprising a front wall for said hopper, and means for mounting said apron on said frame for self adjusting movement upwardly, downwardly, inwardly and outwardly relative to said frame and the dump bodies of trucks passing thereover; said mounting means comprising flexible support means for said apron defining a normal position of said apron relative to said frame and yieldable means normally biasing said apron to said normal position, said support means and said biasing means yieldably accommodating upward, downward, inward and outward movement of the apron should contact between a truck and the apron produce such movement.

References Cited

UNITED STATES PATENTS

| | | | |
|---|---|---|---|
| 3,049,822 | 8/1962 | McMullen | 37—155 |
| 3,061,956 | 11/1962 | Braden. | |
| 2,572,776 | 10/1951 | Smith | 94—44 |
| 2,779,508 | 1/1957 | Ensinger | 94—44 XR |
| 2,848,930 | 8/1958 | Thompson | 94—44 |
| 2,888,864 | 6/1959 | Plas | 94—46 |
| 2,962,947 | 12/1960 | MacDonald | 94—44 |
| 3,015,261 | 1/1962 | MacDonald | 94—44 XR |
| 3,109,351 | 11/1963 | Dunn | 94—44 |
| 3,177,785 | 4/1965 | MacDonald | 94—44 |
| 3,216,337 | 11/1965 | MacDonald | 94—44 |

JACOB L. NACKENOFF, Primary Examiner

U.S. Cl. X.R.

37—155; 94—46